United States Patent
Orr et al.

(10) Patent No.: US 11,208,154 B2
(45) Date of Patent: Dec. 28, 2021

(54) VEHICLE BODY STRUCTURE WITH REINFORCEMENT INCLUDING ADDITIVELY MANUFACTURED BRACKET

(71) Applicant: Ford Global Technologies, LLC, Dearborn, MI (US)

(72) Inventors: Andrea Jane Orr, Ferndale, MI (US); Michael James Freeman, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 125 days.

(21) Appl. No.: 16/798,808

(22) Filed: Feb. 24, 2020

(65) Prior Publication Data

US 2021/0261204 A1 Aug. 26, 2021

(51) Int. Cl.
*B62D 27/02* (2006.01)
*B62D 25/02* (2006.01)
*B33Y 80/00* (2015.01)

(52) U.S. Cl.
CPC .......... *B62D 27/02* (2013.01); *B62D 25/025* (2013.01); *B33Y 80/00* (2014.12)

(58) Field of Classification Search
CPC ....... B62D 27/02; B62D 25/025; B33Y 80/00

USPC .......................................................... 296/209
See application file for complete search history.

(56) References Cited

U.S. PATENT DOCUMENTS

| 10,252,751 | B2* | 4/2019 | Faruque ............... B62D 21/157 |
| 2019/0047031 | A1 | 2/2019 | Hahnlen et al. |
| 2019/0184462 | A1 | 6/2019 | Pullini et al. |
| 2020/0095937 | A1* | 3/2020 | Broome .................. F02C 7/222 |
| 2020/0148327 | A1* | 5/2020 | Elson .................... B29C 53/382 |
| 2020/0346696 | A1* | 11/2020 | Donabedian ......... B62D 29/001 |
| 2021/0054852 | A1* | 2/2021 | Verma ................... F04D 29/321 |

FOREIGN PATENT DOCUMENTS

| CN | 110434223 A | 11/2019 |
| DE | 102017212999 A1 | 1/2019 |
| GB | 2568538 A | 5/2019 |

* cited by examiner

*Primary Examiner* — Pinel E Romain
(74) *Attorney, Agent, or Firm* — David Coppiellie; Carlson, Gaskey & Olds, P.C.

(57) ABSTRACT

This disclosure relates to a motor vehicle, and in particular a vehicle body structure for a motor vehicle, with a reinforcement structure including an additively manufactured bracket. An example motor vehicle has a vehicle body structure including a reinforcement structure. The reinforcement structure includes a tube and a bracket additively manufactured to the tube.

18 Claims, 4 Drawing Sheets

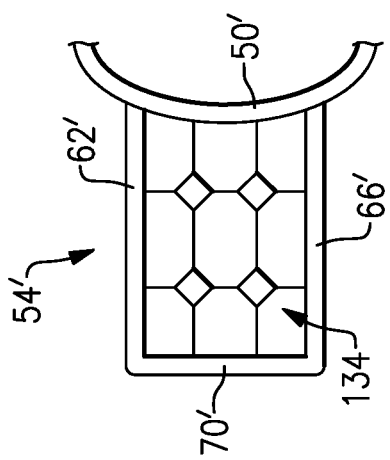
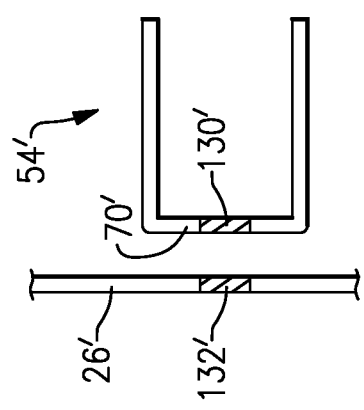
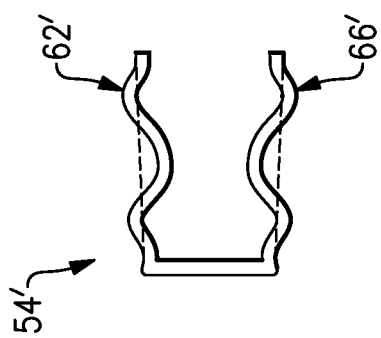
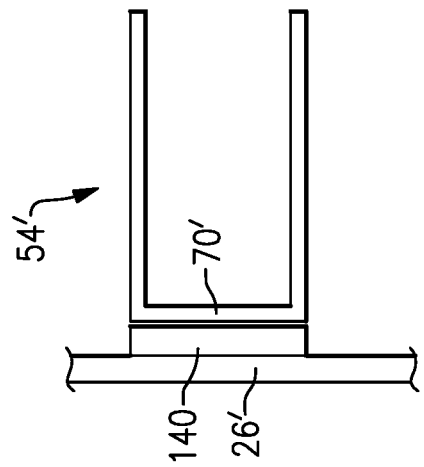
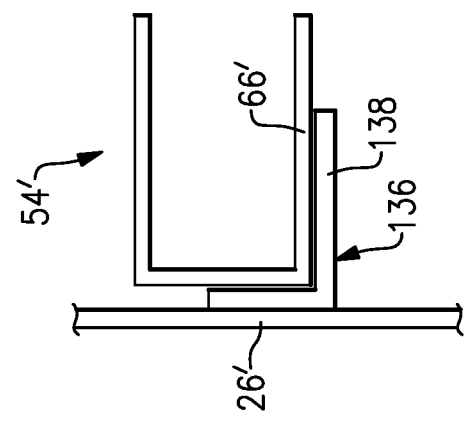

US 11,208,154 B2

VEHICLE BODY STRUCTURE WITH REINFORCEMENT INCLUDING ADDITIVELY MANUFACTURED BRACKET

TECHNICAL FIELD

This disclosure relates to a motor vehicle, and in particular a vehicle body structure for a motor vehicle, with a reinforcement structure including an additively manufactured bracket.

BACKGROUND

Motor vehicles are known to include vehicle body structures with various pillars, rails, and beams. In some known vehicles, various portions of the vehicle body structure are reinforced.

SUMMARY

A motor vehicle according to an exemplary aspect of the present disclosure includes, among other things, a vehicle body structure including a reinforcement structure. The reinforcement structure includes a tube and a bracket additively manufactured to the tube.

In a further non-limiting embodiment of the foregoing motor vehicle, the bracket includes a first leg having a first end attached to the tube, a second leg having a first end attached to the tube, and a third leg connecting second ends of the first and second legs. Further, the third leg extends in a direction substantially perpendicular to the first and second legs.

In a further non-limiting embodiment of any of the foregoing motor vehicles, the bracket is a first of a plurality of brackets additively manufactured to the tube, the first bracket is additively manufactured to a first side of the tube, and a second bracket is additively manufactured to a second side of the tube opposite the first side.

In a further non-limiting embodiment of any of the foregoing motor vehicles, the first and second brackets are different sizes.

In a further non-limiting embodiment of any of the foregoing motor vehicles, a third bracket is additively manufactured to a bottom of the tube, and a fourth bracket is additively manufactured to a top of the tube.

In a further non-limiting embodiment of any of the foregoing motor vehicles, one or both of the third bracket and the fourth bracket is substantially U-shaped and comprises a first leg having a first end attached to the tube, a second leg substantially parallel to the first leg and having a first end attached to the tube, and a third leg including a first portion connecting a second end of the first leg to a first side of a joining strip. The third leg further includes a second portion connecting a second end of the second leg to a second side of the joining strip.

In a further non-limiting embodiment of any of the foregoing motor vehicles, the joining strip is attached to a first portion of the vehicle body structure and a second portion of the vehicle body structure.

In a further non-limiting embodiment of any of the foregoing motor vehicles, the vehicle body structure is a sill, the first portion of the vehicle body structure is an inner sill panel, and the second portion of the vehicle body structure is an outer sill panel.

In a further non-limiting embodiment of any of the foregoing motor vehicles, one of the third bracket and the fourth bracket comprises a first leg having a first end contacting the tube and a second end spaced-apart from the tube, a second leg substantially parallel to the first leg and having a first end contacting the tube and a second end spaced-apart from the tube, a first curved leg connecting the first ends of the first and second legs, and a second curved leg connecting the second ends of the first and second legs.

In a further non-limiting embodiment of any of the foregoing motor vehicles, the tube is a first tube and the reinforcement structure includes a second tube, and the second tube is in contact with the second curved leg.

In a further non-limiting embodiment of any of the foregoing motor vehicles, the first and second legs each include at least one curve.

In a further non-limiting embodiment of any of the foregoing motor vehicles, the at least one curve is configured such that the first and second legs resemble sine waves in cross-section.

In a further non-limiting embodiment of any of the foregoing motor vehicles, the third leg includes a threaded opening configured to mate with a threaded shank of a fastener.

In a further non-limiting embodiment of any of the foregoing motor vehicles, the bracket includes at least one internal rib.

In a further non-limiting embodiment of any of the foregoing motor vehicles, the bracket includes a plurality of internal ribs forming a lattice connecting the first leg, second leg, third leg, and the tube.

In a further non-limiting embodiment of any of the foregoing motor vehicles, the vehicle body structure includes a locating tab projecting toward the bracket.

In a further non-limiting embodiment of any of the foregoing motor vehicles, the vehicle body structure includes a seal adjacent the bracket.

A method according to an exemplary aspect of the present disclosure includes, among other things, additively manufacturing a bracket onto a tube of a reinforcement structure for a vehicle body structure.

In a further non-limiting embodiment of the foregoing method, the tube is a first tube and the reinforcement structure includes a second tube, the bracket includes a curved surface, and, following formation of the bracket, the second tube is placed onto the curved surface.

In a further non-limiting embodiment of any of the foregoing methods, the bracket is additively manufactured to a joining strip, and the joining strip is attached to the vehicle body structure.

BRIEF DESCRIPTION OF THE DRAWINGS

FIG. 4 illustrates an example embodiment of a bracket with curved legs.

FIG. 5 illustrates an example embodiment of a bracket with a threaded opening and a corresponding threaded opening in a sill.

FIG. 6 illustrates an example embodiment of a bracket including an internal rib structure.

FIG. 7 illustrates an example arrangement of a locating tab relative to a bracket.

FIG. 8 illustrates an example arrangement of a seal relative to a bracket.

DETAILED DESCRIPTION

This disclosure relates to a motor vehicle, and in particular a vehicle body structure for a motor vehicle, with a reinforcement structure including an additively manufactured bracket. An example motor vehicle has a vehicle body structure including a reinforcement structure. The reinforcement structure includes a tube and a bracket additively manufactured to the tube. The disclosed arrangement leverages a hybrid manufacturing process, in which some portions of the reinforcement structure are formed using more traditional manufacturing techniques, and others are formed by additive manufacturing. This disclosure reduces material waste and eliminates certain tooling costs. Further, the reinforcement structure can be customized and tailored to include certain bracket arrangements, as desired, to accomplish various design objectives.

Figure 1:
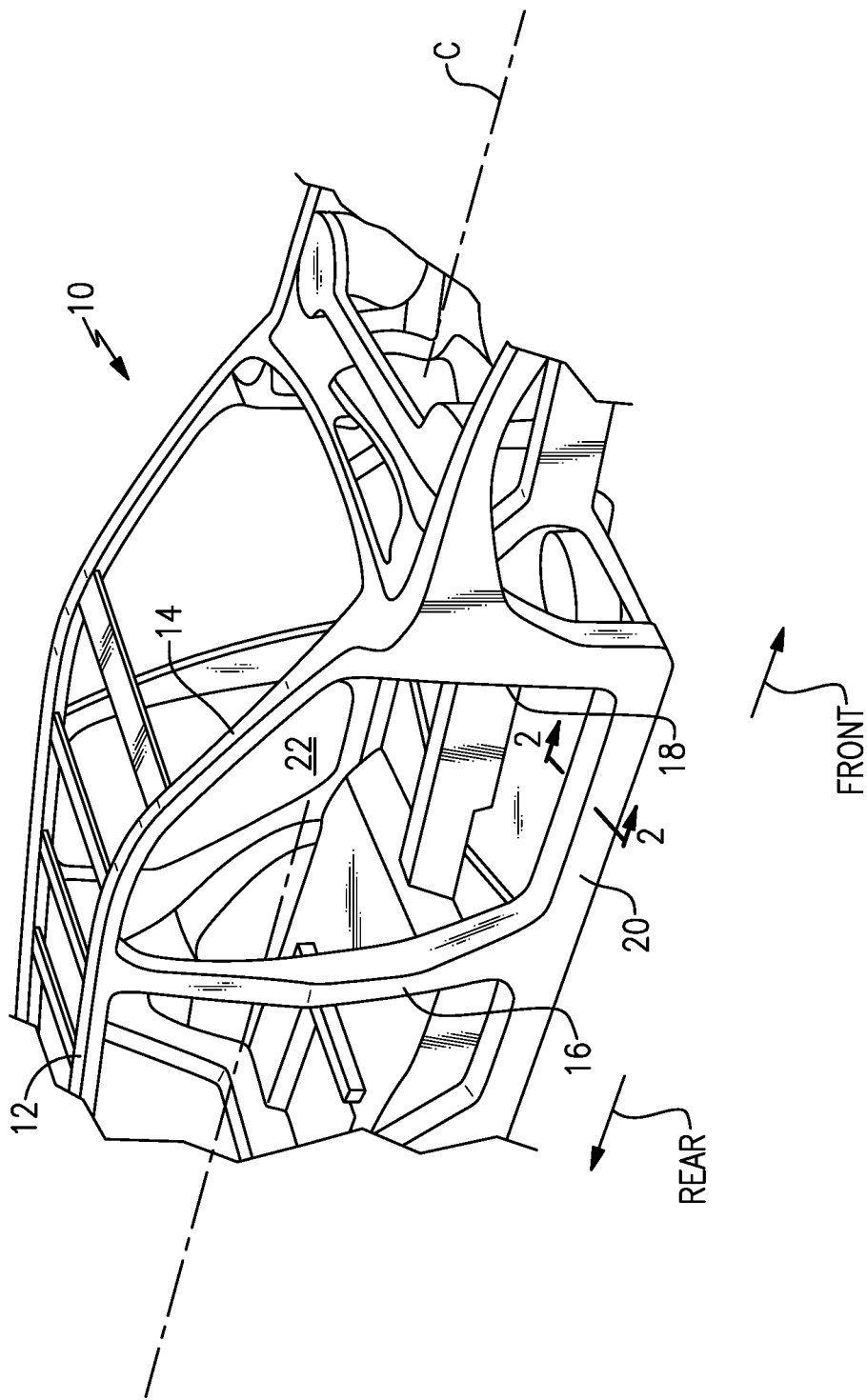
FIG. 1 is a side-perspective view of an example body structure for a motor vehicle.

FIG. 1 is a side-perspective view of a vehicle body structure 10 ("body structure 10") for a motor vehicle ("vehicle"). The body structure 10 includes, among other parts, a side rail 12, an A-pillar 14, a B-pillar 16, a hinge pillar 18 (which is sometimes referred to as an A-pillar tower reinforcement) configured to connect to a door hinge, and a sill 20. In FIG. 1, the side rail 12, A-pillar 14, B-pillar 16, hinge pillar 18, and sill 20 circumscribe an opening 22. Eventually, a passenger door is mounted to the hinge pillar 18 and is configured to selectively open and close relative to the opening 22. While the passenger side of the body structure 10 is shown and described relative to FIG. 1, it should be understood that the body structure 10 is substantially symmetrical about its centerline C, and that the body structure 10 includes substantially similar structures on the driver side of the body structure 10.

Figure 2:
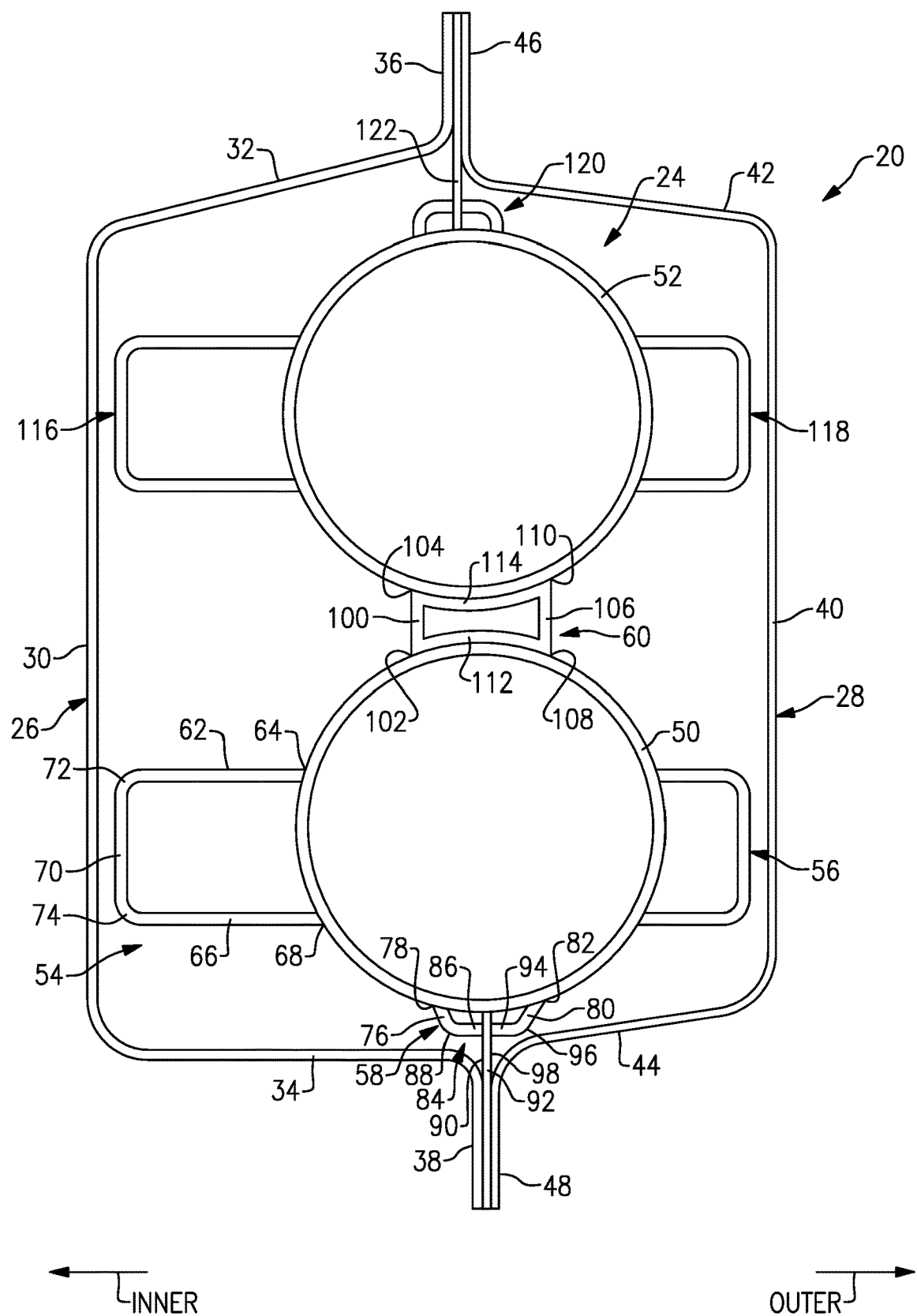
FIG. 2 is a cross-sectional view taken along line 2-2 from FIG. 1 and illustrates an example arrangement of a reinforcement structure relative to a sill.

The body structure 10 includes at least one reinforcement structure, and, in a particular example, both the passenger and driver sides of the body structure 10 each include at least one reinforcement structure. In FIG. 2, the sill 20 includes an example reinforcement structure 24. Both the sill 20 and the reinforcement structure 24 may be made of metallic materials, such as steel. While the reinforcement structure 24 is shown relative to the sill 20, other components of the body structure 10 can include a similarly-arranged reinforcement structure. Specifically, a sill on the driver side of the body structure 10 also includes a substantially similar reinforcement structure. Further, the term reinforcement structure is not used herein as a nonce term, and is not intended to serve as a replacement for means. Rather, the term is used herein to refer to structures configured to reinforce the body structure 10.

With continued reference to FIG. 2, the sill 20 includes two portions providing the exterior of the sill 20. Specifically, the sill 20 includes an inner sill panel 26 and an outer sill panel 28, the latter of which may be referred to as a rocker panel. Alternatively, the entire sill 20 may be referred to as a rocker panel. The inner and outer directions are labeled in FIG. 2 for ease of reference.

The inner sill panel 26 includes a vertical wall 30 extending between upper and lower walls 32, 34, which extend substantially horizontally, in directions substantially perpendicular to the vertical wall 30 and substantially parallel to the inner and outer directions. The inner sill panel 26 further includes upper and lower flanges 36, 38 projecting upwardly and downwardly, respectively, from a corresponding one of the upper and lower walls 32, 34. Likewise, the outer sill panel 28 includes a vertical wall 40 extending between upper and lower walls 42, 44, which extend substantially perpendicular to the vertical wall 40. The outer sill panel 28 further includes upper and lower flanges 46, 48 projecting upwardly and downwardly, respectively, from a corresponding one of the upper and lower walls 42, 44.

The reinforcement structure 24 is arranged generally within the sill 20, and in particular is arranged generally between the inner and outer sill panels 26, 28. The reinforcement structure 24 includes at least one tube and at least one bracket additively manufactured to the tube. In the example of FIG. 2, the reinforcement structure 24 includes a first tube 50 and a second tube 52 vertically above the first tube 50. The first and second tubes 50, 52 are hollow in this example. In cross-section, the first and second tubes 50, 52 may be circular or non-circular. Further, the reinforcement structure 24 includes a plurality of brackets attached to one or both of the first and second tubes 50, 52. The brackets are members that project from the first and/or second tubes 50, 52 and are designed to absorb loads, damp vibrations or noises, or form mechanical connections between various structures, such as between the first and second tubes 50, 52 or between the first and second tubes 50, 52 and one of the inner and/or outer sill panels 26, 28, as examples. Further detail of the reinforcement structure 24, including exemplary arrangements of the brackets, will be described in detail below.

In general, the first and second tubes 50, 52 may be formed using traditional manufacturing techniques such as roll forming. The brackets are additively manufactured to one or both of the first and second tubes 50, 52 using known additive manufacturing processes such as direct metal laser sintering (DMLS) or cold spraying. As a result of the additive manufacturing process, the brackets become fused to the first and/or second tubes 50, 52. Further, since the brackets are formed using additive manufacturing, they may take on a form that either cannot be produced or is not easily produced using more conventional manufacturing techniques. Further still, by additively manufacturing the brackets, the expense of tooling that would otherwise have been associated with producing the brackets is eliminated. To this end, additively manufacturing the brackets permits customization of the reinforcement structure 24 without needing to change any tooling.

An example arrangement of brackets relative to the first tube 50 will now be described. In the example of FIG. 2, four brackets 54, 56, 58, 60 are additively manufactured, and fused to, an outer surface of the first tube 50. With reference to bracket 54, which is a side bracket, the bracket 54 is substantially U-shaped in cross-section, and includes a first leg 62 having a first end 64 attached to the first tube 50, a second leg 66 substantially parallel to the first leg 62 and having a first end 68 attached to the first tube 50, and a third leg 70 connecting second ends 72, 74 of the first and second legs 62, 66. The third leg 70 extends in a direction substantially perpendicular to the first and second legs 62, 66.

In FIG. 2, the bracket 54 is additively manufactured to the inner side of the first tube 50. Bracket 56 is arranged substantially similarly to the bracket 54, except that the bracket 56 is arranged on an opposite side—the outer side—of the first tube 50. In this example, the brackets 54, 56 are circumferentially spaced-apart by about 180° relative to the circumference of the first tube 50. In FIG. 2, however, the brackets 54, 56 are differently-sized or differently-shaped. In particular, the bracket 54 projects further from the first tube 50 by virtue of the first and second legs 62, 66 being longer than the corresponding structures of the bracket 56. The bracket 56 could be larger than the bracket 54 in other examples. Further, the brackets 54, 56 could be substantially the same size in some examples.

The bracket 58 is additively manufactured to a bottom of the first tube 50. The bracket 58 is substantially U-shaped, and includes a first leg 76 having a first end 78 attached to the first tube 50, a second leg 80 substantially parallel to the first leg 76 and having a first end 82 attached to the first tube 50. The bracket 58 further includes a third leg 84 including a first portion 86 connecting a second end 88 of the first leg to a first side 90 of a joining strip 92, and a second portion 94 connecting a second end 96 of the second leg 80 to a second side 98 of the joining strip 92. The joining strip 92 may be placed such that it contacts a bottom of the first tube 52, and the bracket 58 may be additively manufactured relative to the first and second sides 90, 98 of the joining strip 92 such that the joining strip 92 is fused to the bracket 58 during the additive manufacturing process. The joining strip 92 is, in an example, attached to the sill 20 adjacent the lower flanges 38, 48 of the inner and outer sill panels 26, 28. Specifically, the joining strip 92 is either welded, such as spot welded, to the lower flanges 38, 48 or attached in some other way, such as using fasteners, like rivets. The joining strip 92 is a strip of metallic material, such as steel, in an example.

With continued reference to FIG. 2, the bracket 60 is additively manufactured to the top of the first tube 50, and is spaced-apart from the bracket 58 by about 180° relative to the circumference of the first tube 50. The bracket 60, in this example, is arranged between the first tube 50 and the second tube 52. The bracket 60 may be fused to one or both of the first and second tubes 50, 52. When fused to the first tube 50, for example, the second tube 52 may rest directly on the bracket 60. The second tube 52, in this example, is placed on the bracket 60 after the bracket 60 is additively manufactured.

The bracket 60 includes a first leg 100 having a first end 102 in contact with the first tube 50 and a second end 104 spaced-apart from the first tube 50. In this example, the second end 104 is in contact with the second tube 52. The bracket 60 further includes a second leg 106 substantially parallel to the first leg 100. The second leg 106 has a first end 108 in contact with the first tube 50 and a second end 110 spaced-apart from the first tube 50. The second end 110 is in contact with the second tube 52.

The bracket 60 further includes first and second curved legs 112, 114. The first curved leg 112 extends between first ends 102, 108 of the first and second legs 100, 106 and the second curved leg 114 extends between second ends 104, 110. The first and second curved legs 112, 114 are curved such that they substantially correspond to the contours of the first and second tubes 50, 52. The first curved leg 112 is concave when viewed from beneath the bracket 60, and the second curved leg 114 is concave when viewed from above the bracket 60.

The second tube 52 is fused to a bracket 116 arranged substantially similar to the bracket 54, a bracket 118 arranged substantially similar to the bracket 56, and a bracket 120 arranged substantially similar to the bracket 58. The bracket 120, specifically, is fused to a joining strip 122 that is welded to the upper flanges 36, 46 of the inner and outer sill panels 26, 28. In reinforcement structures with only one tube, such as the first tube 50, the bracket 60 would be replaced with a bracket resembling bracket 120. In reinforcement structures with more than two tubes, the bracket 120 would be replaced with a bracket resembling bracket 60, and a third tube would be arranged relative to the second tube 52 similar to how the second tube 52 is arranged relative to the first tube 50.

The brackets 54, 56, 58, 60, 116, 118, and 120 are each single-walled structures, in this example. Further, the term "leg" is used herein to refer to sections of the brackets. The term "end" in the context the "legs" refers to ends of the legs or corners where adjacent legs meet.

While an example arrangement of the reinforcement structure 24 has been shown and described relative to FIG. 2, it should be understood that this disclosure extends to other arrangements, such as other arrangements of the brackets. In particular, the brackets may perform a number of functions, including increasing the rigidity and/or stiffness of the sill 20, absorbing loads applied to the sill 20, reducing vibrations, etc. Depending on the application, the brackets may be placed at select locations along the length of the sill 20.

Figure 3:
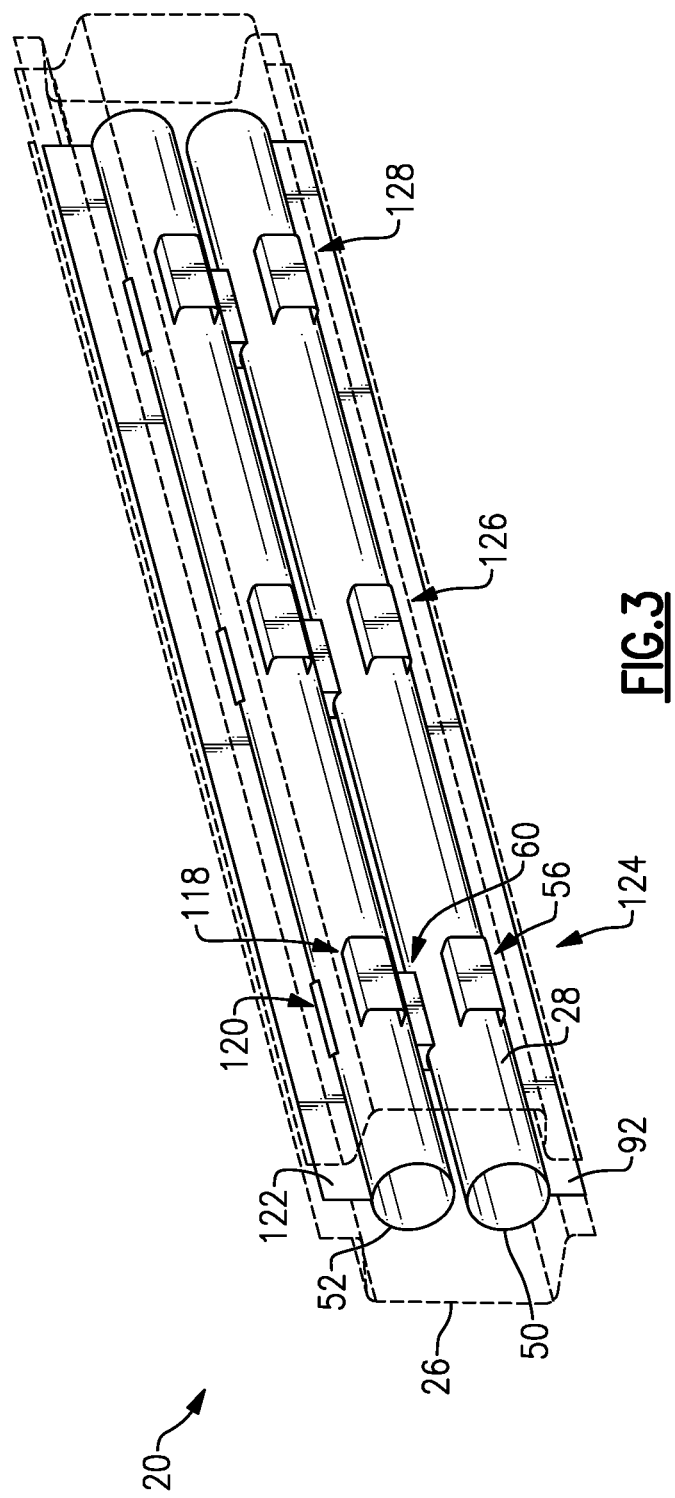
FIG. 3 is a side-perspective view of an example arrangement of a reinforcement structure relative to a sill, with the sill drawn semi-transparently for ease of viewing the reinforcement structure.

In one example, the reinforcement structure 24 includes a plurality of sets of brackets. The bracket arrangement described with reference to FIG. 2, for example, provides a first set of brackets 124, as shown in FIG. 3. The reinforcement structure 24 in FIG. 3 includes a second set of brackets 126 and a third set of brackets 128, both substantially identical to the first set of brackets 124. The sets of brackets 124, 126, 128 are spaced-apart from one another along a length dimension of the reinforcement structure 24. With reference to the first set of brackets 124, in the view of FIG. 3, the brackets 56, 60, 118, and 120 are visible. As shown, the length of the brackets within the first set 124 are substantially equal to one another and are significantly less than the length of the first and second tubes 50, 52 and the joining strips 92, 122, each of which are continuous and extend along substantially the entire length of the sill 20, and in particular along substantially the entire length of the inner and outer sill panels 26, 28.

The brackets, and in particular the side brackets, such as brackets 54, 56, 116, 118 in FIG. 2, may be configured to perform certain functions. Additively manufacturing the brackets makes the various designs, which will be discussed below, relatively easy to implement without requiring any tooling changes, for example.

FIGS. 4-8 illustrate variations of a bracket 54', which is substantially similar to the bracket 54 except where indicated. In some of FIGS. 4-8 an inner sill panel 26' is also shown. The inner sill panel 26' is similar to the inner sill panel 26 except where indicated. The brackets 54' of FIGS. 4-8 could be used in place of any one or more of the side brackets of FIG. 2, namely brackets 54, 56, 116, 118. Further, any one or more of the sets of brackets 124, 126, 128 could include side brackets configured similar to any of the brackets 54'. The inner sill panel 26' is representative of how either the inner sill panel 26 or the outer sill panel 28 may be arranged. Further, and in general, like parts in FIGS. 4-8 include the same reference numerals used in FIG. 2, with a trailing '.

In the example of FIG. 4, the first and second legs 62', 66' of the bracket 54' include at least one curve. In particular, the first and second legs 62', 66' are configured such that they resemble sine waves in cross-section. The sine waves oscillate above and below horizontal planes, shown by dashed lines. This arrangement of the first and second legs 62', 66' increases the ability of the bracket 54' to absorb loads. This disclosure is not limited to sine waves and extends to other optimized surfaces. The first and second legs 62', 66' could also be curved in the length direction (i.e., in and out of the page relative to FIG. 4).

In the example of FIG. 5, the third leg 70' of the bracket 54' includes a threaded opening 130. In this example, the threaded opening 130 is configured to mate with a threaded shank of a fastener, which may pass through a corresponding threaded opening 132 in the inner sill panel 26'. A head of the fastener may abut the inner sill panel 26'. While shown relative to the bracket 54' and the inner sill panel 26', this arrangement may be particularly useful in the context of the outer sill panel 28 for the attachment of rocker moldings or step bars to the sill.

In FIG. 6, the bracket 54' includes at least one internal rib. The at least one internal rib connects, either directly or indirectly, one of the first, second, and third legs 62', 66', 70' to either one of the other legs or the first tube 50'. In FIG. 6, the bracket 54' includes a plurality of internal ribs forming a lattice 134. The lattice 134 includes a plurality of ribs which are crossed and/or connected to form spaces therebetween, such as square, diamond, or honeycomb-shaped spaces. The lattice 134 connects the first leg 62', second leg 66', third leg 70', and the tube 50'. The lattice 134 increases the rigidity of the bracket 54' and helps absorb loads. Instead of a lattice, the bracket 54' could include another type of engineered infill.

In FIG. 7, the inner sill panel 26' includes a locating tab 136 projecting from the inner sill panel 26' toward the bracket 54'. The locating tab 136 may provide a support for the bracket 54' and assist with orienting the bracket 54' relative to the inner sill panel 26'. The locating tab 136 is substantially L-shaped in this example, and includes a projection 138 projecting beneath the bracket 54'. The projection 138 is in contact with a lower surface of the second leg 66' and extends substantially parallel to the second leg 66'. In an example, when the second leg 66' rests on the projection 138, a user determines that proper alignment has been achieved.

In FIG. 8, a seal 140 is arranged adjacent the bracket 54', and in particular is laterally between the third leg 70' and the inner sill panel 26'. The seal 140 may be made of an elastomeric or polymeric material, in one example. In a further example, the seal 140 is an expandable seal. The seal 140 in FIG. 8 spans the entire height of the third leg 70'. The seal 140 serves to damp vibrations. The seal 140 is also representative of an adhesive or other type of sound damping or energy absorbing material, such as a polymer material configured to damp sound or absorb energy.

It should be understood that terms such as "about," "substantially," and "generally" are not intended to be boundaryless terms, and should be interpreted consistent with the way one skilled in the art would interpret those terms. It should also be understood that directional terms such as "upward," "downward," "top," "bottom," "front," "rear," "side," etc., are used herein relative to the normal operational attitude of a vehicle for purposes of explanation only, and should not be deemed limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
 a vehicle body structure including a reinforcement structure, wherein the reinforcement structure includes a tube and a bracket additively manufactured to the tube,
 wherein the bracket includes a first leg having a first end attached to the tube, a second leg having a first end attached to the tube, and a third leg connecting second ends of the first and second legs, and
 wherein the third leg extends in a direction substantially perpendicular to the first and second legs.

2. The motor vehicle as recited in claim 1, wherein:
 the bracket is a first of a plurality of brackets additively manufactured to the tube,
 the first bracket is additively manufactured to a first side of the tube, and
 a second bracket is additively manufactured to a second side of the tube opposite the first side.

3. The motor vehicle as recited in claim 2, wherein the first and second brackets are different sizes.

4. The motor vehicle as recited in claim 2, wherein:
 a third bracket is additively manufactured to a bottom of the tube, and
 a fourth bracket is additively manufactured to a top of the tube.

5. The motor vehicle as recited in claim 4, wherein one or both of the third bracket and the fourth bracket is substantially U-shaped and comprises:
 a first leg having a first end attached to the tube,
 a second leg substantially parallel to the first leg and having a first end attached to the tube, and
 a third leg including a first portion connecting a second end of the first leg to a first side of a joining strip, and further including a second portion connecting a second end of the second leg to a second side of the joining strip.

6. The motor vehicle as recited in claim 5, wherein the joining strip is attached to a first portion of the vehicle body structure and a second portion of the vehicle body structure.

7. The motor vehicle as recited in claim 6, wherein:
 the vehicle body structure is a sill,
 the first portion of the vehicle body structure is an inner sill panel, and
 the second portion of the vehicle body structure is an outer sill panel.

8. The motor vehicle as recited in claim 5, wherein one of the third bracket and the fourth bracket comprises:
 a first leg having a first end contacting the tube and a second end spaced-apart from the tube,
 a second leg substantially parallel to the first leg and having a first end contacting the tube and a second end spaced-apart from the tube,
 a first curved leg connecting the first ends of the first and second legs, and
 a second curved leg connecting the second ends of the first and second legs.

9. The motor vehicle as recited in claim 8, wherein:
 the tube is a first tube and the reinforcement structure includes a second tube, and
 the second tube is in contact with the second curved leg.

10. The motor vehicle as recited in claim 1, wherein the first and second legs each include at least one curve.

11. The motor vehicle as recited in claim 10, wherein the at least one curve is configured such that the first and second legs resemble sine waves in cross-section.

12. The motor vehicle as recited in claim 1, wherein the third leg includes a threaded opening configured to mate with a threaded shank of a fastener.

13. The motor vehicle as recited in claim 1, wherein the bracket includes at least one internal rib.

14. The motor vehicle as recited in claim 13, wherein the bracket includes a plurality of internal ribs forming a lattice connecting the first leg, second leg, third leg, and the tube.

15. The motor vehicle as recited in claim 1, wherein the vehicle body structure includes a locating tab projecting toward the bracket.

16. The motor vehicle as recited in claim 1, wherein the vehicle body structure includes a seal adjacent the bracket.

17. A method, comprising:
additively manufacturing a bracket onto a tube of a reinforcement structure for a vehicle body structure, wherein the tube is a first tube and the reinforcement structure includes a second tube, wherein the bracket includes a curved surface, and wherein, following formation of the bracket, the second tube is placed onto the curved surface.

18. A method, comprising:
additively manufacturing a bracket onto a tube of a reinforcement structure for a vehicle body structure, wherein the bracket is additively manufactured to a joining strip, and the joining strip is attached to the vehicle body structure.

* * * * *